Jan. 6, 1970  W. BURKHARDT ET AL  3,487,721
DRIVING SYSTEM FOR A TANKER
Filed June 3, 1968
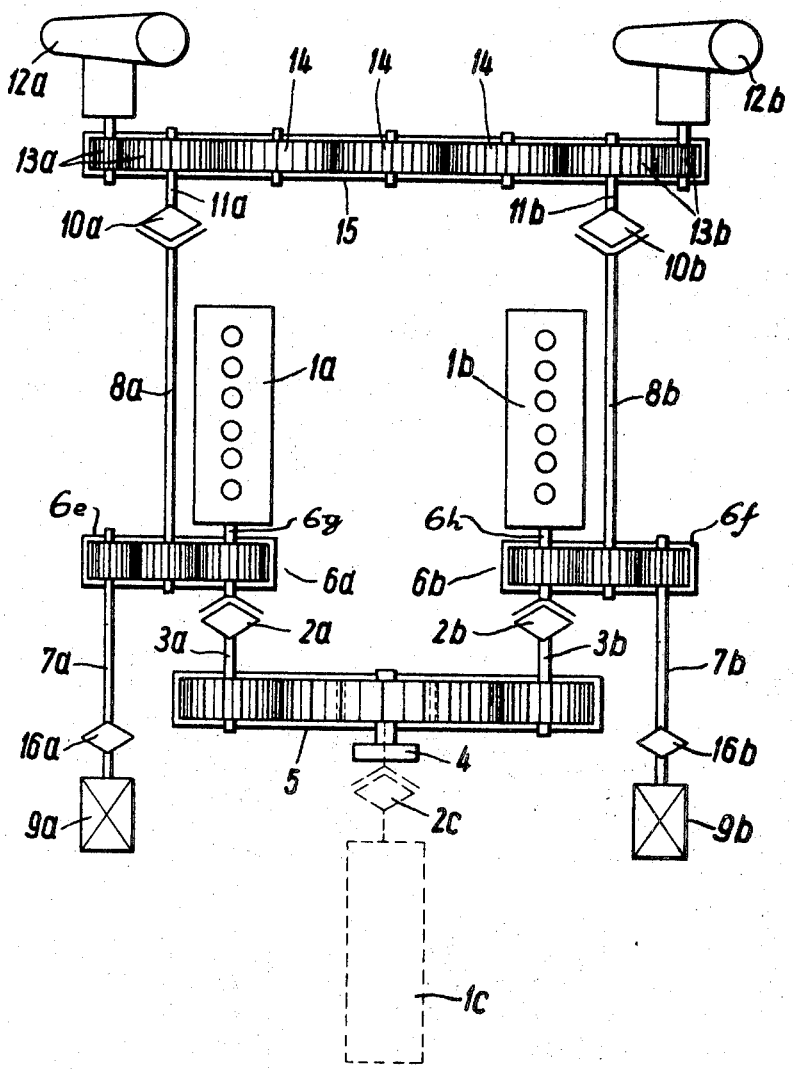
Inventors:
Walter Burkhardt,
Heinz M. Hierrig, and
Karl-Heinz Liefert,
By Leonard D. Hammond,
Their Attorney.

United States Patent Office 3,487,721
Patented Jan. 6, 1970

3,487,721
DRIVING SYSTEM FOR A TANKER
Walter Burkhardt, Witten, Heinz M. Hiersig, Dusseldorf-Oberkassel, and Karl-Heinz Siefert, Witten-Rudinghausen, Germany, assignors to Lohmann & Stolterfoht A.G., Witten (Ruhr), Germany, a corporation of Germany
Filed June 3, 1968, Ser. No. 733,930
Claims priority, application Germany, June 2, 1967, 1,506,816
Int. Cl. F16h *37/06;* F01k *23/00;* F02b *73/00*
U.S. Cl. 74—661          8 Claims

ABSTRACT OF THE DISCLOSURE

A driving system for a tanker has two engines in releasable driving connection with a gear for the propeller, with two generators and with a gearing that can drive two pumps; and each engine is so dimensioned, that when the propeller gear is released, it will drive one generator and both pumps.

---

The invention relates to tankers, and relates more particularly to driving systems for a tanker, for propelling the tanker at sea and, respectively, for driving the auxiliary equipment of the tanker in port.

It is the purpose of systems of this type to utilize the engines for the dual purpose of propulsion of the tanker and for energizing the generators and the pumps for loading and unloading.

Combined driving systems for ship propellers and auxiliary equipment composed entirely of generators are known, in which four engines parallel of the longitudinal direction of the ship are arranged and are connected to the primary shafts of the gear assembly that drives the propeller shaft; and a generator is disposed in the shafting between two engines and the main part of the shiftable clutch assigned thereto (German Patent No. 848,609, FIG. 1).

It has also been proposed (FIG. 2 of the aforesaid German Patent No. 848,609) to connect the generators with the main part of the aforesaid shifting clutch by means of a shaft that is disposed in the hollow primary shaft of the gear assembly and the hollow secondary part of the shifting clutch.

In both cases the rotor of the generator is energized as soon as the engine is started. The relatively low rotational speed of the engine usually requires an expensive arrangement of the generator that is driven with the same rotational speed.

It is accordingly among the principal objects of the invention to avoid the aforesaid expensive drawbacks of the prior art.

It is another object of the invention to provide a driving system for a tanker and its auxiliary equipment, in which there are provided two engines which at sea either singly or together drive the slower turning propeller shaft; they may, however, selectively be shifted for use in port onto a gearing that drives two high-speed feed pumps for the loading and, respectively, unloading of the tanker; and during the latter operation, either of the two engines that is energized, may additionally drive a faster running generator.

It is a further object of the invention to provide for a propitious spatial arrangement of the system, that permits, where desired, to drive the reduction gear assembly for the propeller shaft with additional engines.

Further objects and advantages of the invention will be set forth in part in the following specification and in part will be obvious therefrom without being specifically referred to, the same being realized and attained as pointed out in the claims hereof.

Broadly speaking, the foregoing aims are achieved by the arrangement of two combustion engines that are arranged substantially parallel to the longitudinal direction of the ship, and are provided with sternward drive members, such as a drive flange, and drive by means of a shiftable clutch the primary shafts of the reduction gear assembly that, in turn, drives the propeller shaft. At the same time, the engines are in driving connection with distributor gear transmissions each of which has two transmission shafts, hence connecting the engines on one hand with the rotor of the generator and on the other hand, by means of a further shifting clutch with the input shaft of a one-step gear train that drives the feed pumps. The gear train comprises an odd number of meshing reversing gears, and each engine is so dimensioned that upon the release from the engines of the reduction gear assembly, it will drive one of the generators and both feed pumps at full load.

The advantage of such a system is to render it possible to service, at port, one of the two engines, or to overhaul it, while the other engine may be utilized for energizing the feed pumps and one of the generators. During loading and, respectively, unloading at dockside, the one engine that is not needed to drive the feed pumps may be connected to the propeller shaft in order to shift the ship with the aid of the propeller and the rudder into a desired position at the point of transfer.

For a fuller understanding of the nature and objects of the invention, reference should be had to the following detailed description, taken in connection with the accompanying drawings, the single view of which is a schematic illustration of a driving system in accordance with the invention.

In carrying the invention into effect in the embodiments which have been selected for illustration in the accompanying drawings and for description in this specification, there are provided two combustion engines 1a and 1b, each with a sternward driving flange (not shown in detail). Each engine is provided with a shaft 6g, 6h, that, as explained later on, forms an intake shaft which protrudes through a distributor gear transmission 6a and 6b, respectively, that is housed in a housing 6e and 6f, respectively.

Each of the throughgoing intake shafts 6g and 6h, respectively, is connected, by means of a fluid operated highly elastic double cone friction clutch 2a, 2b with the primary shaft 3a, 3b of a reduction gear assembly 5 that drives a propeller shaft 4. The gear transmission 6a, 6b and its casing 6e, 6f is disposed between the respective engine 1a, 1b and the clutch 2a, 2b thereof. Each distributor gear transmission 6a, 6b is a one-step transmission, and has two output shafts, namely a first transmission shaft 8a, 8b and a second transmission shaft 7a, 7b that are constantly rotated by the intake shaft 6g, 6h when the respective engine is in motion.

The first transmission shafts 8a, 8b revolve approximately with the same rotational speed as the engine shaft, and are disposed close next to the crank chamber of the respective engine, though disposed lower than the crank shaft thereof and externally of the two paired engines 1a, 1b.

The first transmission shafts 8a and 8b drive, by means of a shiftable clutch 10a, 10b the input shafts 11a, 11b of two one-step gearings 13a and 13b, the output shafts of which each drive a feed pump 12a and 12b, respectively, for the loading and unloading of the tanker.

The driving gears of the gearings 13a and 13b are interconnected by an odd number of reversing gears 14 (in the view there are shown three gears 14), that provide with the gearings 13a and 13b a gear train. The gears 13a and 13b, together with the gears 14, that provide a gear bridge of the gear train, are disposed in a single casing 15. The casing 15, in point of longitudinal direction of the ship, is disposed forwardly of the engines 1a and 1b. The feed pumps 12a and 12b, similarly, are disposed forwardly of the casing 15.

Preferably the housing 6e, 6f of the distributor gear transmissions 6a, 6b is arranged independently of the engines 1a and 1b. As previously indicated, the first transmission shafts 8a, 8b are disposed near the intake shafts 6g, 6h, though disposed lower than these intake shafts; next to the first transmission shafts 8a, 8b, there is arranged a second transmission shaft 7a, 7b, and the ratios of the rotational speeds between the intake shafts 6g, 6h, the first transmission shafts, 8a, 8b and the second transmission shafts 7a, 7b is preferably about 1:1:3.6. The first transmission shaft 8a, 8b, it will be observed, should revolve at low speed, as, due to its long length, it is subject to vibrations. Furthermore, the first transmission shafts 8a, 8b should be disposed as low as possible, in order to avoid obstruction of access to the engines 1a, 1b. In accordance with a preferable arrangement, the first transmission shafts 8a, 8b are disposed on the outside of the paired engines 1a, 1b.

The aforesaid second transmission shafts 7a, 7b of the distributor gear transmissions 6a, 6b are disposed still further out with respect to the paired engines 1a, 1b, and outside the position of the first transmission shafts 8a, 8b; the second transmission shafts 7a, 7b pass on the outside of the reduction gear assembly 5 and are connected to the rotors of the generators 9a and 9b that are disposed rearwardly of the reduction gear assembly 5. The generators 9a, 9b are field regulated, and the rotors thereof are connected to the aforesaid second transmission shafts 7a, 7b by means of simple clutches 16a and 16b, respectively.

Where the width of the gear reduction assembly 5 permits, the second transmission shafts 7a, 7b may be positioned closer inwardly towards the center line of the entire system; in such a case, however, the gear of each second transmission shaft 7a, 7b would need to mesh directly with the gear of the intake shaft 6g, 6h, or be positioned above the gear of the first transmission shaft 8a, 8b and mesh therewith.

Each of the two engines 1a and 1b is so dimensioned, that it can drive a generator 9a or 9b at full load and both feed pumps 12a and 12b at full load.

In the view, there is shown in broken lines an additional engine 1c that, in accordance with a modification, may aid in driving the gear reduction assembly 5 for energizing the propeller shaft 4. The engine 1c is arranged above the propeller shaft 4, and is releasably connected to the reduction gear assembly by means of a fluid operated highly elastic double cone friction clutch 2c.

In accordance with a further modification, two additional engines (not shown) instead of the single additional engine 1c (shown in broken lines) may be provided, to aid in driving the propeller shaft 4. Where but a single additional engine 1c is provided, it may be positioned either between the two engines 1a and 1b, or centrally above the propeller shaft, as shown in broken lines in the drawing. Where two additional engines are provided, they may be arranged on both sides of the propeller shaft 4; in the latter case, the shafts 3a and 3b may be formed as through-going shafts, similarly to the shafts 6g and 6h (confer FIG. 1 of the aforesaid German Patent No. 848,609).

We wish it to be understood that we do not desire to be limited to the exact details of construction shown and described, for obvious modifications will occur to a person skilled in the art.

Having thus described the invention, what we claim as new and desire to be secured by Letters Patent, is as follows:

1. A driving system, for use in connection with a tanker having a propeller shaft and auxiliary equipment including two generators and two pumps, comprising in combination two engines adapted to be disposed substantially parallel to the longitudinal direction of the tanker, a sternward drive member driven from each engine, a reduction gear assembly adapted to be in driving connection with said propeller shaft and including primary shafts, each engine being in releasable driving connection with a primary shaft of said reduction gear assembly, two one-step distributor gear transmissions each continuously energized by an engine, each distributor gear transmission comprising two output shafts, a gear train being adapted to be in driving connection with said feed pumps and including an odd number of meshing gears, one output shaft of each distributor gear transmission adapted to be in disconnectable driving connection with a generator, the other output shaft of each distributor gear transmission being in releasable driving connection with said gear train, whereby each engine is adapted to be in releasable driving connection with said propeller shaft, generators and feed pumps, each engine being so dimensioned, that, upon release of said reduction gear assembly from said engines, it will drive one generator and both feed pumps at full load.

2. A driving system, as claimed in claim 1, a casing for said gear train disposed relative to said direction forwardly of said engines, said feed pumps being disposed forwardly relative to said casing.

3. A driving system, as claimed in claim 1, a housing for each distributor gear transmission disposed independently of said engine of said transmission, a shifting clutch between said engine and its primary shaft of said gear reduction assembly, said housing being disposed between said engine and said shifting clutch.

4. A driving system, as claimed in claim 1, each distributor gear transmission comprising an intake shaft, a first transmission shaft positioned adjacent and lower than said intake shaft and being operable to drive said gear train, and a second transmission shaft adjoining said first transmission shaft and being operative to drive a generator.

5. A driving system, as claimed in claim 4, the ratios of rotational speeds between said intake shafts, said first transmission shafts and said second transmission shafts, respectively, being about 1:1:3.6.

6. A driving system, as claimed in claim 4, said first transmission shafts being disposed externally of the paired engines.

7. A driving system, as claimed in claim 4, the generators being disposed rearwardly of said reduction gear assembly relative to said longitudinal direction.

8. A driving system, as claimed in claim 1, at least one shifting clutch, at least one engine by means of said shifting clutch being releasably connected directly to said reduction gear assembly.

References Cited

UNITED STATES PATENTS

| | | |
|---|---|---|
| 1,990,810 | 2/1935 | Young. |
| 2,541,625 | 2/1951 | Webster. |
| 2,742,798 | 4/1956 | Niederhauser _____ 74—661 |
| 3,106,067 | 10/1963 | Darlington et al. _____ 60—97 X |

LEONARD H. GERIN, Primary Examiner

U.S. Cl. X.R.

60—97; 74—664, 665